(12) United States Patent
Tiirola et al.

(10) Patent No.: US 12,328,166 B2
(45) Date of Patent: Jun. 10, 2025

(54) BEAMFORMED TRANSMISSIONS IN WIRELESS COMMUNICATION NETWORKS

(71) Applicant: Nokia Technologies Oy, Espoo (FI)

(72) Inventors: Esa Tiirola, Oulu (FI); Jari Hulkkonen, Oulu (FI); Jukka Talvitie, Ylöjärvi (FI); Kari Pajukoski, Oulu (FI); Toni Levanen, Tampere (FI); Mikko Valkama, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 435 days.

(21) Appl. No.: 17/996,393

(22) PCT Filed: May 6, 2020

(86) PCT No.: PCT/EP2020/062590
§ 371 (c)(1),
(2) Date: Oct. 17, 2022

(87) PCT Pub. No.: WO2021/223863
PCT Pub. Date: Nov. 11, 2021

(65) Prior Publication Data
US 2023/0208485 A1     Jun. 29, 2023

(51) Int. Cl.
*H04B 7/06*     (2006.01)
*H04B 7/0456*     (2017.01)
*H04B 7/08*     (2006.01)

(52) U.S. Cl.
CPC ......... *H04B 7/0617* (2013.01); *H04B 7/0482* (2013.01); *H04B 7/063* (2013.01); *H04B 7/086* (2013.01)

(58) Field of Classification Search
CPC .... H04B 7/0617; H04B 7/0482; H04B 7/063; H04B 7/086
See application file for complete search history.

(56) References Cited

U.S. PATENT DOCUMENTS

| | | | |
|---|---|---|---|
| 2010/0273499 A1* | 10/2010 | van Rensburg | H04W 72/542 |
| | | | 455/450 |
| 2011/0207494 A1 | 8/2011 | Zhu et al. | |
| 2018/0167127 A1* | 6/2018 | Ozaki | H04B 7/0691 |
| 2019/0173537 A1 | 6/2019 | Cai et al. | |

(Continued)

OTHER PUBLICATIONS

"New SID: Study on supporting NR from 52.6GHz to 71 GHz", 3GPP TSG RAN Meeting #86, RP-193259, Agenda: 9.1.1, Intel Corporation, Dec. 9-12, 2019, 3 pages.

(Continued)

*Primary Examiner* — Hashim S Bhatti
(74) *Attorney, Agent, or Firm* — Lippes Mathias LLP

(57) ABSTRACT

According to an example aspect of the present invention, there is provided a method comprising, receiving, by a wireless network node, at least one parameter from a wireless terminal, wherein the at least one parameter is related to at least one transmit and/or receive beam of the wireless terminal and based on at least one metric with respect to a normal of at least one antenna panel of the wireless terminal, determining, based on the at least one parameter, a configuration for communicating with the wireless terminal and communicating with the wireless terminal according to the determined configuration.

20 Claims, 6 Drawing Sheets

(56) References Cited

U.S. PATENT DOCUMENTS

| | | | | |
|---|---|---|---|---|
| 2020/0076491 A1* | 3/2020 | Zhang | ................ | H04B 7/0632 |
| 2023/0036727 A1* | 2/2023 | Gebremariam | ....... | H04W 16/28 |
| 2023/0155661 A1* | 5/2023 | Landström | ........... | H04B 7/0695 |
| | | | | 375/262 |

OTHER PUBLICATIONS

"3rd Generation Partnership Project; Technical Specification Group Radio Access Network; NR; Physical channels and modulation (Release 16)", 3GPP TS 38.211, V16.0.0, Dec. 2019, pp. 1-129.

Cai, "Modeling and Mitigating Beam Squint in Millimeter Wave Wireless Communication", Dissertation, Mar. 2018, 159 pages.

"IEEE 802.11ad", Wikipedia, Retrieved on Oct. 19, 2022, Webpage available at : https://en.wikipedia.org/wiki/IEEE_802.11ad.

Reil et al., "Millimeter-Wave Beamforming: Antenna Array Design Choices & Characterization", MTT White Paper, 2016, 27 pages.

International Search Report and Written Opinion received for corresponding Patent Cooperation Treaty Application No. PCT/EP2020/062590, dated Jan. 29, 2021, 13 pages.

"Beam squint analysis for FR2 UEs", 3GPP TSG-RAN WG4 Meeting #94-e-Bis, R4-2004872, Agenda: 6.14.1.3, Qualcomm Incorporated, Apr. 20-30, 2020, 6 pages.

\* cited by examiner

BEAMFORMED TRANSMISSIONS IN WIRELESS COMMUNICATION NETWORKS

RELATED APPLICATION

This application was originally filed as PCT Application No. PCT/EP2020/062590 on May 6, 2020, which is incorporated herein by reference in its entirety.

FIELD

Various example embodiments relate in general to wireless communication networks and more specifically, to improvements for beamformed transmissions in such networks.

BACKGROUND

Scarcity of available frequency spectrum is an issue for various wireless communication networks, such as for cellular communication networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is related to increasing available frequency spectrum by exploiting higher frequencies, like frequencies beyond 52.6 GHz. Beamforming is typically used for communication on such high frequencies and there is a need to provide improved methods, apparatuses and computer programs for beamformed transmissions. Such improvements may be exploited for 5G networks and also for other communication networks in the future as well, even for lower frequencies, such as 20-52.6 GHz.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided a first method comprising receiving, by a wireless network node, at least one parameter from a wireless terminal, wherein the at least one parameter is related to at least one transmit and/or receive beam of the wireless terminal and based on at least one metric with respect to a normal of at least one antenna panel of the wireless terminal, determining, based on the at least one parameter, a configuration for communicating with the wireless terminal and communicating with the wireless terminal according to the determined configuration. The first method may be performed by a wireless network node, or a control device configured to control the functioning thereof, possibly when installed therein.

Embodiments of the first aspect may comprise at least one feature from the following bulleted list or any combination of the following features:

the at least one metric comprises an angular distance between the normal of the at least one antenna panel of the wireless terminal and a direction of the at least one transmit and/or receive beam of the wireless terminal;

the angular distance between the normal of the at least one antenna panel of the wireless terminal and the direction of the at least one transmit and/or receive beam of the wireless terminal comprises an azimuth and/or elevation angle;

the at least one transmit and/or receive beam is for at least one predefined beam pair link;

the at least one parameter is further based on a metric that comprises a frequency selective signal-to-interference ratio of the at least one receive and/or transmit beam of the wireless terminal;

the at least one metric comprises an angular distance between a predefined beam direction and a direction of a wave;

the at least one parameter is based on a metric that comprises beamforming gain and/or loss;

the at least one parameter is based on a metric that relates to orientation of the wireless terminal, or orientation of at least one panel of the wireless terminal, and/or location information of the wireless terminal;

receiving, by the wireless network node, information about dimensions of an antenna panel of the wireless terminal;

receiving, by the wireless network node, a random access channel preamble or a reference signal from the wireless terminal, estimating a beam squint at the wireless network node based on the random access channel preamble or the reference signal and determining the configuration for communicating with the wireless terminal based on the estimated beam squint;

the beam squint is estimated based on a beam angle with reference to a panel normal of the wireless network node;

said determining the configuration for communicating with the wireless terminal comprises decreasing a frequency dimension precoder granularity upon determining that at least one of a beam squint at the wireless terminal and a beam squint at the wireless network node has increased;

said determining the configuration for communicating with the wireless terminal comprises switching from channel bonding to transmission point aggregation upon determining that at least one of a beam squint at the wireless terminal and a beam squint at the wireless network node has increased;

said determining the configuration for communicating with the wireless terminal comprises reducing a width of a carrier upon determining that at least one of a beam squint at the wireless terminal and a beam squint at the wireless network node has increased.

According to a second aspect of the present invention, there is provided a second method comprising determining, by a wireless terminal, at least one metric with respect to a normal of at least one antenna panel of the wireless terminal, determining, by the wireless terminal, at least one transmit and/or receive beam, determining, by the wireless terminal, at least one parameter for the at least one transmit and/or receive beam according to the at least one metric and transmitting, by the wireless terminal, the at least one parameter to the wireless network node. The second method may be performed by a wireless terminal, or a control device configured to control the functioning thereof, possibly when installed therein.

Embodiments of the second aspect may comprise at least one feature from the following bulleted list or any combination of the following features:
- the at least one metric comprises an angular distance between the normal of the at least one antenna panel of the wireless terminal and a direction of the at least one transmit and/or receive beam of the wireless terminal;
- the angular distance between the normal of the at least one antenna panel of the wireless terminal and the direction of the at least one transmit and/or receive beam of the wireless terminal comprises an azimuth and/or elevation angle;
- the at least one parameter is determined based on at least one measurement performed by the wireless terminal;
- the at least one transmit and/or receive beam is for at least one predefined beam pair link;
- said determining the at least one parameter is further based on a metric that comprises a frequency selective signal-to-interference ratio of the at least one transmit and/or receive beam of the wireless terminal;
- the at least one metric comprises an angular distance between a predefined beam direction and a direction of a wave;
- said determining the at least one parameter is based on a metric that comprises beamforming gain and/or loss;
- the at least one parameter is based on a metric that relates to orientation of the wireless terminal, or orientation of at least one panel of the wireless terminal, and/or location information of the wireless terminal;
- decreasing a frequency dimension precoder granularity when at least one of a beam squint at the wireless terminal and a beam squint at the wireless network node has increased;
- switching from channel bonding to transmission point aggregation when at least one of a beam squint at the wireless terminal and a beam squint at the wireless network node has increased;
- reducing a width of a carrier when at least one of a beam squint at the wireless terminal and a beam squint at the wireless network node has increased;
- transmitting, by the wireless terminal, information about dimensions of the at least one antenna panel of the wireless terminal to the wireless network node;
- transmitting, by the wireless terminal, a random access channel preamble or a reference signal to enable estimation of a beam squint at the wireless network node;
- the wireless terminal is a user equipment or mobile termination part of a relay and the wireless network node is a base station or a distributed unit part of the relay.

According to a third aspect of the present invention, there is provided an apparatus comprising at least one processing core, at least one memory including computer program code, the at least one memory and the computer program code being configured to, with the at least one processing core, cause the apparatus at least to perform the first method. The at least one memory and the computer program code may be configured to, with the at least one processing core, cause the apparatus at least to perform receive, by a wireless network node, at least one parameter from a wireless terminal, wherein the at least one parameter is related to at least one transmit and/or receive beam of the wireless terminal and based on at least one metric with respect to a normal of at least one antenna panel of the wireless terminal, determine, based on the at least one parameter, a configuration for communicating with the wireless terminal and communicate with the wireless terminal according to the determined configuration. The apparatus of the third aspect may be a wireless network node, or a control device configured to control the functioning thereof, possibly when installed therein.

According to a fourth aspect of the present invention, there is provided an apparatus comprising at least one processing core, at least one memory including computer program code, the at least one memory and the computer program code being configured to, with the at least one processing core, cause the apparatus at least to perform the second method. The at least one memory and the computer program code may be configured to, with the at least one processing core, cause the apparatus at least to perform determine, by a wireless terminal, at least one metric with respect to a normal of at least one antenna panel of the wireless terminal, determine, by the wireless terminal, at least one transmit and/or receive beam, determine, by the wireless terminal, at least one parameter for the at least one transmit and/or receive beam according to the at least one metric and transmit, by the wireless terminal, the at least one parameter to the wireless network node. The apparatus of the fourth aspect may be a wireless terminal, or a control device configured to control the functioning thereof, possibly when installed therein.

According to a fifth aspect of the present invention, there is provided an apparatus comprising means for performing the first method. The apparatus may comprise means for receiving, by a wireless network node, at least one parameter from a wireless terminal, wherein the at least one parameter is related to at least one transmit and/or receive beam of the wireless terminal and based on at least one metric with respect to a normal of at least one antenna panel of the wireless terminal, means for determining, based on the at least one parameter, a configuration for communicating with the wireless terminal and means for communicating with the wireless terminal according to the determined configuration. The apparatus of the fifth aspect may be a wireless network node, or a control device configured to control the functioning thereof, possibly when installed therein.

According to a sixth aspect of the present invention, there is provided an apparatus comprising means for performing the second method. The apparatus may comprise means for determining, by a wireless terminal, at least one metric with respect to a normal of at least one antenna panel of the wireless terminal, means for determining, by the wireless terminal, at least one transmit and/or receive beam, means for determining, by the wireless terminal, at least one parameter for the at least one transmit and/or receive beam according to the at least one metric and means for transmitting, by the wireless terminal, the at least one parameter to the wireless network node. The apparatus of the fifth aspect may be a wireless terminal, or a control device configured to control the functioning thereof, possibly when installed therein.

According to a seventh aspect of the present invention, there is provided a non-transitory computer readable medium having stored thereon a set of computer readable instructions that, when executed by at least one processor, cause an apparatus to at least perform the first method. According to an eighth aspect of the present invention, there is provided a non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

The procedures described herein provide improvements for beamformed transmissions in wireless communication networks. More specifically, embodiments of the present invention provide a measurement and reporting framework which can be used e.g. to mitigate issues related to beam squint. According to the measurement and reporting framework a wireless terminal, such as a User Equipment, UE, may measure and report at least one parameter based on a metric with respect to a normal of at least one antenna panel of the wireless terminal. For instance, the metric with respect to the normal of the at least one antenna panel of the wireless terminal may be an angular distance between the normal of the at least one antenna panel of the wireless terminal and a direction of a beamformed signal received by the wireless terminal from a wireless network node, such as a Base Station, BS. The wireless terminal may transmit the at least one parameter to the wireless network node and thus, the wireless network node may exploit the at least one parameter for determining a configuration for communicating with the wireless terminal by taking into account the beam squint phenomenon.

Figure 1:
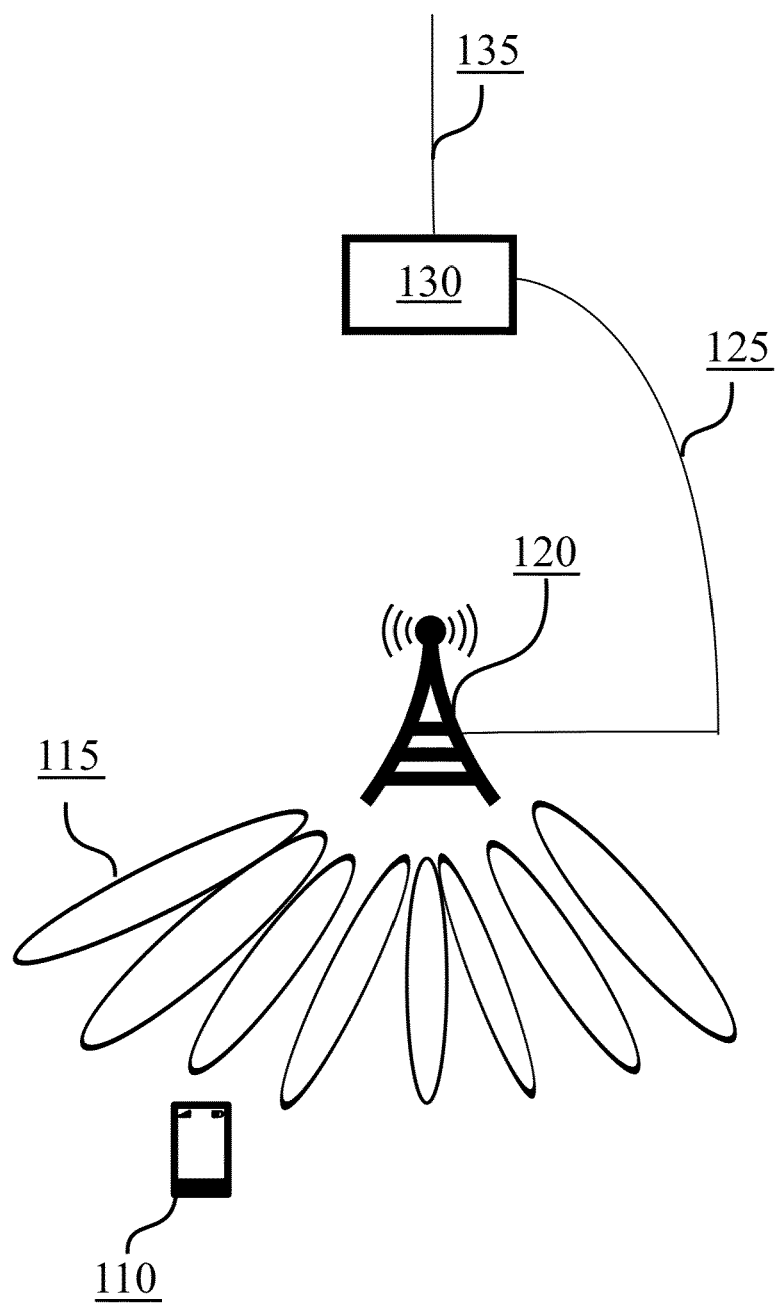
FIG. 1 illustrates an exemplary network scenario in accordance with at least some embodiments.

FIG. 1 illustrates an exemplary network scenario in accordance with at least some embodiments. According to the exemplary network scenario of FIG. 1, there may be a cellular communication system, which comprises one or more wireless terminals 110, such as UEs, one or more wireless network nodes 120, such as BSs, and core network element 130. Wireless terminal 110 may be connected to wireless network node 120 via air interface using beams 115. That is to say, the cellular communication network may be a beam-based system, operating for example on carrier frequencies beyond 52.6 GHz, even though lower frequencies are also possible as well. In some embodiments, wireless terminal 110 and wireless network node 120 may be multipanel devices comprising multiple panels or subpanels with independent transmitter/receiver chains and each panel or subpanel may be used to transmit one or more beams at a time.

Wireless terminal 110 may comprise, for example, a UE, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal, such as a Customer Premises Equipment, CPE. In an embodiment, wireless terminal 100 may be a Mobile Termination, MT, part of an Integrated Access and Backhaul node, IAB node, or other relay node such as out-band-relay facilitating backhaul connection between a parent node and a relay node. In the example system of FIG. 1, wireless terminal 110 may communicate wirelessly with wireless network node 120, or a cell of wireless network node 120, via at least one beam 115.

Air interface between wireless terminal 110 and wireless network node 120 may be configured in accordance with a Radio Access Technology, RAT, which both wireless terminal 110 and wireless network node 120 are configured to support. Examples of cellular RATs include Long Term Evolution, LTE, New Radio, NR, which may also be known as fifth generation, 5G, radio access technology and Multe-Fire. For example, in the context of LTE, wireless network node 120 may be referred to as eNB while in the context of NR wireless network node 120 may be referred to as gNB. In any case, embodiments of the present invention are not restricted to any particular wireless technology. Instead, embodiments may be exploited in any communication network, wherein beamforming is used.

In some embodiments of the present invention, the exemplary network scenario may comprise a relay instead of, or in addition to, wireless terminal 110 and/or wireless network node 120. Relaying may be used for example when operating on millimeter-wave frequencies. One example of the relay may be an Integrated Access and Backhaul, IAB, node. The IAB node may be referred to as a self-backhauling relay as well. Another example of a relay may be an out-band relay. In general, the relay node may comprise two parts:

1) Distributed Unit, DU, part which may facilitate functionalities of a BS, such as a gNB. Thus, in some embodiments, wireless network node 120 may refer to a relay and more specifically to the DU part of the relay.
2) Mobile Termination, MT, part which may facilitate functionalities of a UE, i.e., a backhaul link which may be the communication link between a parent node (DU), such as a DU part of a BS, and the relay, such as an IAB node. In some embodiments, the MT part may be referred to as a IAB-UE as well, i.e., the relay may correspond to a UE partly and perform similar operations as wireless terminal 110. Thus, in some embodiments, wireless terminal 110 may refer to a relay and more specifically to the MT part of the relay.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected with at least one other BS as well via an inter-base station interface (not shown in FIG. 1), even though in some embodiments the inter-base station interface may be absent. Wireless network node 120 may be connected, directly or via at least one intermediate node, with core network 130 or with another core network.

Using 5G/NR as an example, embodiments of the present invention may be exploited, e.g., for operation on frequency spectrum beyond 52.6 GHz. Ranges, use cases, deployment scenarios and requirements for such frequency spectrum are being discussed in 3rd Generation Partnership Project, 3GPP, Radio Access Network, RAN, meetings. Objectives discussed in the meetings comprise waveform design for operation beyond 52.6 GHz and study of physical layer design for such frequencies. The designs should take into consideration at least applicable numerology including subcarrier spacing, channel bandwidth (including maximum bandwidth) and practical Radio Frequency, RF, impairments, and their impact on physical layer design.

Even though the present invention is not limited to any specific frequency bands, potential high mm-wave bands for 5G and beyond systems comprise at least unlicensed frequency bands 57-66 GHz and licensed/unlicensed frequency bands 66-71 GHz. Nevertheless, embodiments of the present invention may be utilized for other frequency bands as well, such as frequency range 2 (FR2), i.e. spectrum ~20-52.6 GHz.

Operation on higher carrier frequencies brings various challenges. Embodiments of the present invention address challenges related to beam squint, which may cause severe radio link degradation with large antenna arrays and large channel bandwidths, for example when beamformers based on antenna element wise phase shifters are used. Such beamformers are common for current analog and hybrid beamformer architectures. The hybrid beamformer architecture may consist of multiple analog beamformer architectures.

Beam squint refers to a change in the beam direction as a function of operating frequency, polarization, and/or orientation and the challenges related to the beam squint are more severe if high carrier frequencies are used, because it is expected that wider channel bandwidths and higher number of antennas will be used for communicating on high carrier frequencies. For instance, channel bandwidth may be as high as 14 GHz on carrier frequencies above 52.6 GHz (e.g., assuming bandwidth 57-61 GHz), which causes problems as edge-most subcarriers of the wideband transmission would be directed to different directions. Furthermore, the beam squint phenomenon may be present at both ends of the radio link (wireless terminal 110 and wireless network node 120).

In some example embodiments of the present invention, performance of a RF beamformer, such as wireless network node 120, may be therefore improved by taking into account beam directions of wireless terminal 110 and wireless network node 120 with respect to a normal of at least one antenna panel of wireless terminal 110, an angular distance between a predefined beam direction of a selected beam and a direction of a received signal (i.e., true wave direction), channel bandwidth, dimensions of the antenna panel of wireless terminal 110 and/or number of antenna elements of the RF beamformer. Embodiments of the present invention are particularly beneficial for wideband signals, because approximating time delays with phase shifts for the modulated waveform comes less accurate when the ratio of the instantaneous channel bandwidth and centre frequency increases.

For instance, carrier aggregation or channel bonding may be used to achieve wide channel bandwidths up to 12.8 GHz in the 60 GHz unlicensed band, e.g., using 6×2.16 GHz channels on 60 GHz frequency band. Such wide channel bandwidths may lead to significant angular domain spread of the transmitted signal, especially with large antenna panel sizes due to the large relative ratio of the channel bandwidth with respect to the carrier frequency (e.g., 12.8 GHz/60 GHz~21%). For instance, a signal may be defined as a wide bandwidth signal if the relative ratio of the channel bandwidth with respect to the carrier frequency is above 10%. The definition may be depend on assumed sector angular width and a number of antenna elements though. At least some embodiments of the present invention may be therefore used to improve the performance of carrier aggregation and channel bonding on high frequencies when wide channel bandwidths are used.

Figure 2:
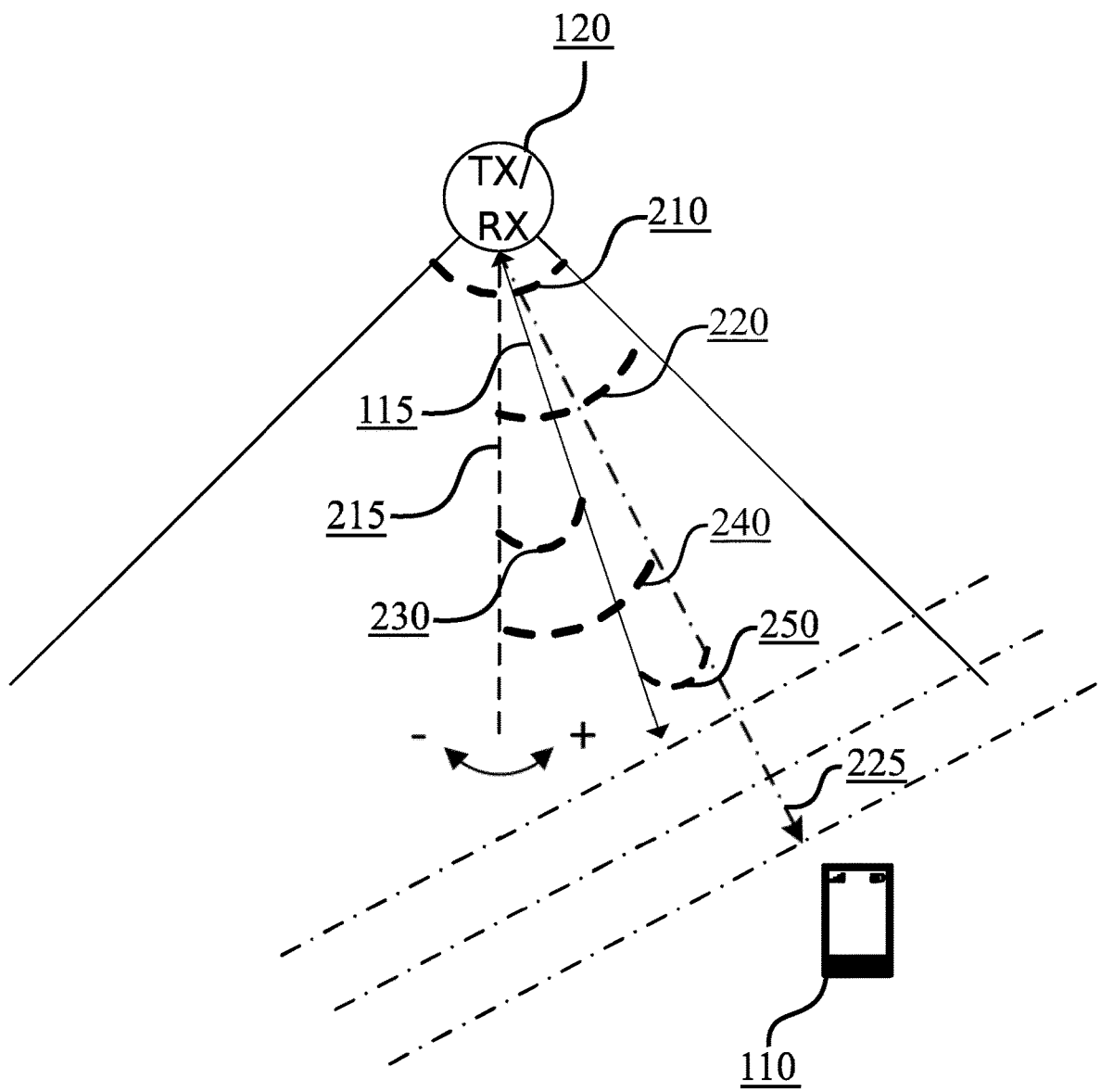
FIG. 2 illustrates some exemplary parameters in accordance with at least some embodiments.

FIG. 2 illustrates some exemplary parameters in accordance with at least some embodiments. In FIG. 2, sector width of wireless network node 120, e.g., 90 degrees, is denoted by 210. A maximum beam angle with respect to normal 215 of at least one antenna panel of wireless network node 120, e.g., 45 degrees, is denoted by 220. A beam angle with respect to normal 215 of the at least one antenna panel of wireless network node 120, e.g., 14 degrees, is denoted by 230. Beam angle 230 may also be referred to as an angular distance between normal 215 of the at least one antenna panel of wireless network node 120 and a direction of beam 115.

Angular distance between true angle of arrival or angle of departure with reference to panel normal 215 is denoted by 240. Angular distance 240 may be for example 16 degrees. Angular distance between true angle of arrival or angle of departure with reference to beam 115 of wireless network node 120 is denoted by 250. Wave 225 may be a direction of wireless terminal 110 and transmission/reception of wireless network node 120 may happen according to beam 115. That is to say, angle offset between beam 115 and wave 225, e.g., 2 degrees, is denoted by 250. Beam 115 may be also referred to as a beamformed signal. In general, an angular distance may be considered as a synonym to an angular offset as well.

It should be noted that beam angle 230 and angular offset 250 may have a significant impact on frequency selectivity of a beamformer, such as wireless terminal 110 or wireless network node 120, especially with wide channel bandwidths due to the beam squint related issues. Beam squint related issues apply to both, wireless terminal 110 and wireless network node 120. In addition, beam squint related issues apply to line-of-sight and non-line-of-sight communications as well. Moreover, with a large number of antenna elements, wide channel bandwidths and increased beam angle with reference to a panel normal, significant angular spreading of beamforming may lead to significant interference increase in the network and/or reduce achievable positioning accuracy. Angular spreading of beamforming may mean that a beam, in terms of an averaged beamforming gain over all subcarriers, gets wider.

For instance, as the beam angle 230 or the channel bandwidth (i.e., offset of the edges of the channel to a carrier frequency) increases, the beam squint problem becomes more pronounced. Transmissions with wide channel bandwidths are highly frequency selective and for example when assuming that the arriving wave and the beamformer of the receiver are not matching exactly, the shape of the frequency selectivity is surprisingly sensitive to angular distance 250 between the selected, predefined beam direction and the true wave direction of the received beamformed signal at the beamformer of the receiver (not shown in FIG. 2).

That is to say, depending on the angular distance between the beamformer of the receiver and arriving wave, the strong attenuation notch moves in the frequency domain. When the offset is 0 degrees, then the strongest attenuation is located symmetrically on both edges of the carrier frequency. The actual realization of true wave angle and beamformer angle of the receiver has not been traditionally taken into account, although it has significant impact on the (link) performance.

Again, especially large frequency offset to the carrier frequency causes significant frequency selective variation. In addition, different carrier frequencies would experience clearly different beamforming gains at different azimuth and elevation angles. All these examples highlight the need for new solutions to handle the operation with wide channel bandwidths.

Embodiments of the present invention therefore provide a measurement, reporting and (re) configuration framework for the cases, wherein wireless terminal 110 and/or wireless network node 120 operates according to RF beamforming, or according to hybrid beamforming. For instance, optimization of transmission and/or reception of wideband signals for wireless terminal 110 by wireless network node 120 is enabled. Capacity of the wireless communication network may be optimized by taking into account issues related to the beam squint. Also, multipanel architecture of wireless terminal 110 and/or wireless network node 120 may be optimally utilized to alleviate issues induced by the beam squint.

Wireless network node 120 may optimize its resource utilization by exploiting the measurement, reporting and (re) configuration framework to achieve maximal beamforming gain for the desired wireless terminal 110 or a group of wireless terminals while maintaining modest beam squint induced frequency selectivity within the effective communications channel. Embodiments of the present invention may be particularly useful for wide channel bandwidth operation, e.g. in the 57 GHz-71 GHz frequency band but other frequencies are possible as well.

For optimal scheduling decisions (and/or configuration) at wireless network node 120, information of the measured beam directions (for active beam pair link(s)) with respect to orientation of at least one antenna panel of wireless terminal 110 may be provided to wireless network node 120 and/or wireless network node 120 may determine information about orientation of the at least one antenna panel of wireless terminal 110 with respect to orientation of at least one antenna panel of wireless network node 120. For instance, wireless network node 120 may obtain information about best beam directions in the local coordinate system of wireless terminal 110 with respect to at least one antenna panel of wireless terminal 110.

Thus, wireless network node 120 may, e.g., define the beam angle used by wireless terminal 110. Information about orientation of the at least one antenna panel of wireless terminal 110 with respect to orientation of at least one antenna panel of wireless network node 120 is useful also for high-accuracy positioning services, which are expected to have high importance in millimeter wave based wireless communications e.g. in industrial verticals. In addition, wireless network node 120 may require wide band frequency selective Channel State Information, CSI, such as Signal-to-Interference Ratio, SINR, measurements or other parameters, to indicate the effect between the selected, predefined beam direction and the true wave direction of the received beamformed signal at wireless terminal 110.

For example, wireless network node 120, such as gNB, may obtain information from wireless terminal 110, such as a UE, of the "goodness" of the currently used transmit/receive beams with respect to different channel bandwidths. Also, wireless network node 120 may be aware of the relative beam directions it is using for communications. Thus, wireless network node 120 may optimize the transmitted signal parameterization to maximize the capacity of the communications link.

Figure 3:
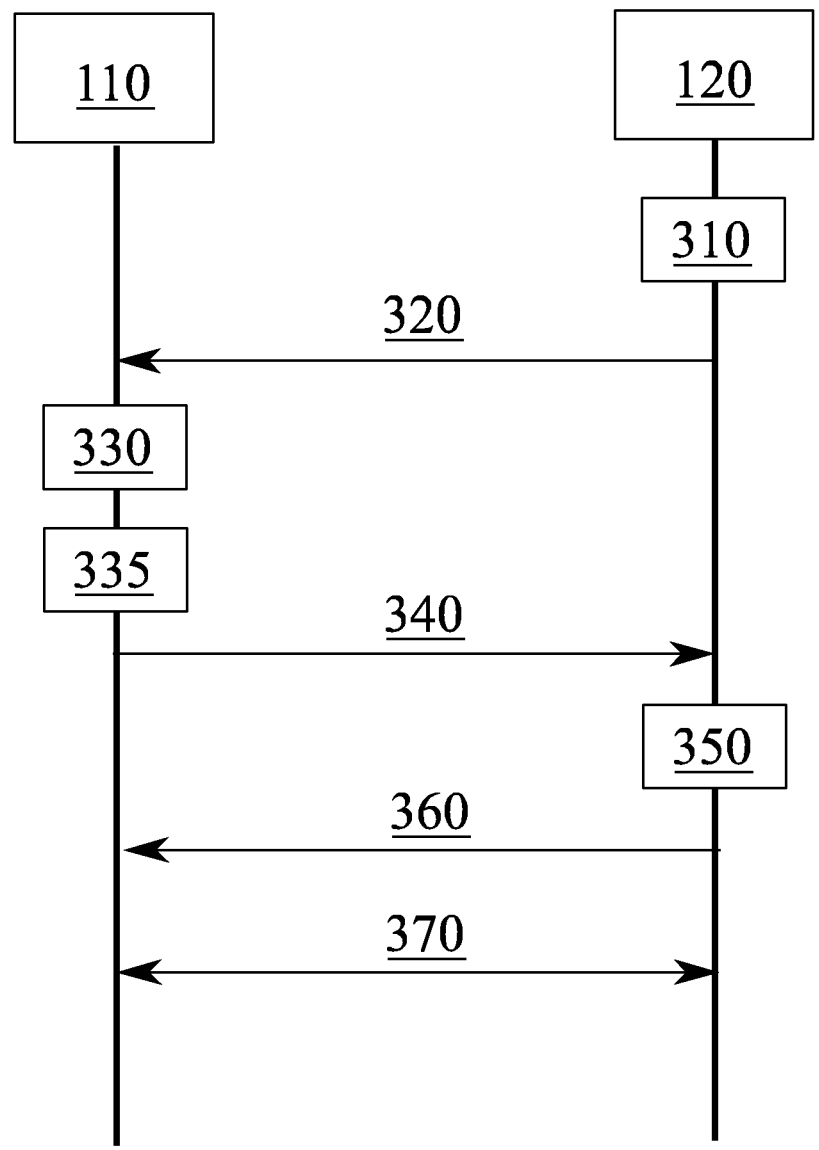
FIG. 3 illustrates a process in accordance with at least some embodiments.

FIG. 3 illustrates a process in accordance with at least some embodiments. On the vertical axes are disposed, from the left to the right, wireless terminal 110 and wireless network node 120 of FIG. 1. Time advances from the top towards the bottom.

In some example embodiments, wireless network node 120 may in the beginning of the process, at optional step 310, decide to configure measurements and reporting, such as CSI measurement/reporting, for at least one wireless terminal 110 with a metric with respect to the normal of at least one antenna panel of wireless terminal 110. For instance, the metric may be an angular distance between the normal of the at least one antenna panel of wireless terminal 110 and a direction of a beamformed signal transmitted/received by wireless network node 110. Moreover, the angular distance between the normal of the at least one antenna panel of wireless terminal 110 and the direction of the transmit and/or receive beam of wireless terminal 110 may comprise an azimuth and/or elevation angle. In general, a metric may define what should be measured by wireless terminal 110.

At optional step 320, wireless network node 120 may transmit a configuration to wireless terminal 110, the configuration indicating that the metric is to be used for performing the at least one measurement. The configuration may be a CSI measurement/reporting configuration with the metric with respect to the normal of at least one antenna panel of wireless terminal 110. In some embodiments, the CSI measurement/reporting configuration may relate to a predefined beam pair link or links. In some embodiments, the configuration may be transmitted via Radio Resource Control, RRC, signalling.

The configuration may also comprise an indication about a predefined triggering scheme, e.g., whether periodic, semi-persistent or aperiodic reporting is to be used. In case of periodic and semi-persistent reporting, the configuration may include configured Physical Uplink Control Channel, PUCCH, resources and a format for the reporting, and possibly also periodicity and slot offset for the reporting.

Alternatively, or in addition, the configuration indicating that at least one other metric is to be used for performing the at least one measurement may indicate a metric that comprises an angular distance between a predefined beam direction and a direction of the beamformed signal transmitted by wireless network node 120 and/or frequency selective SINR feedback of the beamformed signal received by wireless terminal 110. Alternatively, or in addition, wireless network node 120 may also request wireless terminal 110 to report information about dimensions of at least one antenna panel of wireless terminal 110.

Wireless network node 120 may also transmit the beamformed signal that can be used by wireless terminal 110 to perform the at least one measurement based on the metric with respect to the normal of at least one antenna panel of wireless terminal 110. The transmitted beamformed signal may relate to a predefined beam pair link or links.

The predefined beam pair link may correspond to a transmit beam at a transmitter and a receive beam at a receiver. In the case of beam correspondence, the receive and transmit beam of wireless terminal 110 may be the same. The beam pair link may be formed e.g. during the connection establishment. For example, transmit/receive beam of wireless network node 120 may correspond to a SSB beam and the receive/transmit beam of wireless terminal 110 may correspond to the associated beam where a PRACH was transmitted. The beam pair may be updated/maintained, e.g., based on known beam management procedures.

At step 330, wireless terminal 110 may perform at least one measurement of the beamformed signal transmitted by wireless network node 120. The at least one measurement may be based on the metric with respect to a normal of at least one antenna panel of wireless terminal 110, such as the angular distance between the normal of the at least one antenna panel of wireless terminal 110 and a direction of reception of the beamformed signal by wireless terminal 110. The direction of reception may be referred to as a direction of a receive beam of wireless terminal 110 as well.

For instance, the angular distance between the normal of the at least one antenna panel of wireless terminal 110 and the direction of reception of the beamformed signal by wireless terminal 110 may comprise an azimuth and/or elevation angle. Moreover, in some example embodiments, the at least one measurement may be performed based on the configuration received from wireless network node 120 for example.

Thus, wireless terminal 110 may, at step 330, determine at least one metric with respect to a normal of the at least one antenna panel of wireless terminal 110 and also determine at least one transmit and/or receive beam for at least one beam pair link based on the at least one measurement. In addition, wireless terminal 110 may determine at least one parameter for the at least one transmit and/or receive beam according to the metric. In general, the at least one parameter may be a result of a measurement.

In some example embodiments, wireless terminal 110 may perform at least one measurement of the beamformed signal received from wireless network node 120 based on a metric comprising for example an angular distance between a predefined beam direction and a direction of reception of the beamformed signal by wireless terminal 110. The pre-defined beam direction may refer to a direction from which wireless terminal 110 would except to receive the beamformed signal based on previous measurements for example. The predefined beam direction may be a direction of an active beam pair link, or links, for example. The existing predefined beam management procedures (P1-P3) may be used to derive the predefined beam direction.

In some example embodiments, said at least one metric may comprise an angular distance between a predefined beam direction and/or a direction of a wave and/or beamforming gain and/or loss. Alternatively, or in addition, said at least one metric may relate to orientation of wireless terminal 110, or orientation of at least one panel of wireless terminal 110, and location information of wireless terminal 110, thereby allowing derivation of the beam direction in a common coordinate system between wireless terminal 110 and wireless network node 120, especially in line-of-sight scenario. This kind of feedback could be relevant in especially industrial IoT scenario, as it is used also for high accuracy positioning of wireless terminal 110.

At step 335, wireless terminal 110 may determine at least one parameter based on the at least one measurement. The at least one parameter and may be determined for at least one antenna panel of wireless terminal 110. At step 340, wireless terminal may transmit the at least one parameter, to wireless network node 120. The parameter(s) may be transmitted, e.g., in a CSI report.

In some example embodiments, wireless terminal may determine before steps 330-340 that a measurement report, such as a CSI report comprising the at least one parameter should be reported. For instance, wireless terminal 110 may determine based on a timer or a trigger condition received from wireless network node 120 that the at least one measurement and reporting need to be performed. In any case, wireless network node 120 may receive the at least one parameter from wireless terminal 110 and use the received parameter(s) to define a level of beam squint on transmit/receive beamforming of wireless terminal 110 and to determine a configuration for communicating with wireless terminal 110.

In some example embodiments, wireless terminal 110 may also transmit to wireless network node 120 information about dimensions of the at least one antenna panel of wireless terminal 110, such as number of elements in azimuth and/or elevation domain, as it affects the performance. Said information about the dimensions of the antenna panel of wireless terminal 110 may be transmitted in a form of UE capability signalling for example. Alternatively, or in addition, wireless terminal 110 may transmit a beam index, if a reference beam structure is defined by a 3GPP standard specification for example.

In some example embodiments, a pre-defined value table may be exploited as well. The pre-defined value table may be defined in a 3GPP standard specification for example. For instance, the pre-defined value table may indicate beamforming gain loss with respect to the direction of reception of the beamformed signal by wireless terminal 110, e.g., with a specific channel bandwidth and number of antenna elements. The pre-defined value table may be defined separately for each UE category and/or antenna panel type.

In general, the measurement and reporting framework may apply for one or more beams, and/or for one or more antenna panels of wireless terminal 110. Alternatively, or in addition, the measurement and reporting framework may apply for one or more antenna panels of wireless network node 120 similarly.

In some example embodiments, wireless terminal 110 may transmit at least one signal to wireless network node 120, to make it possible for wireless network node 120 to estimate an arrival angle and an angle offset of uplink signals transmitted by wireless terminal 110. The at least one signal transmitted by wireless terminal may be such that it allows wireless network node to estimate relevant parameters, such as beam squint at wireless network node 120. Wireless network node 120 may also determine which transmit beam of wireless network node 120 would be the best one for reception of signals at wireless terminal 110. Physical Random Access Channel, PRACH, preamble is an example of a signal that fulfils the requirements, thereby enabling estimation of beam squint at wireless network node 120. Reference signals, such as Sounding Reference Signal, SRS, and/or Demodulation Reference Signal, DMRS, may be used as well.

So at step 340, wireless network node 120 may receive the at least one parameter from wireless terminal 110, for example in a CSI report, wherein the at least one parameter is related to at least one transmit and/or receive beam of the wireless terminal for at least one beam pair link, e.g. to at least one measurement of wireless terminal 110 of a beamformed signal transmitted by wireless network node 110, and based on the metric with respect to a normal of the at least one antenna panel of wireless terminal 110. Said metric may be for example an angular distance between a predefined beam direction and a direction of reception of the beamformed signal by wireless terminal 110 and/or frequency selective signal-to-interference ratio of the beamformed signal received by wireless terminal 110.

In some example embodiments, wireless network node 120 may receive the at least one uplink signal transmitted by wireless terminal 110 as well. The at least one uplink signal may be a random access channel preamble, such as PRACH preamble, or a reference signal, such as SRS or DMRS. Upon receiving the at least one uplink signal, wireless network node 120 may estimate a level of beam squint at wireless network node 120, e.g., concerning receive and/or transmit beamforming at wireless network node 120, based on the received PRACH preamble.

For instance, wireless network node 120 may determine an arrival angle and angle offset of the signal received on the random access channel from wireless terminal 110 with respect to a beam that is used for reception and estimate the level of beam squint at wireless network node 110 based on the determined arrival angle and angle offset of the signal received on the random access channel. Wireless network node 120 may determine an arrival angle and angle offset of the signal received the random access channel from wireless terminal 110 with respect to a beam that is used for reception in one or more dimensions. Wireless network node 120 may also have knowledge of its own antenna panel dimensions and used transmit/receive beams.

Wireless network node 120 may for example determine an arrival angle of the received uplink signal with respect to a normal of at least one antenna panel of wireless network node 120. Thus, wireless network node 120 may determine information about orientation of the at least one antenna panel of wireless terminal 110 with respect to orientation of at least one antenna panel of wireless network node 120 based on the received uplink signal. Wireless network node 120 may further estimate the beam squint based on the received uplink signal.

At step 350, wireless network node 120 may determine, based on the at least one parameter, a configuration for communicating with wireless terminal 110. For instance, wireless network node 120 may configure or reconfigure one or more parameters related to operation of wireless terminal 110 based on the at least one parameter received from wireless terminal 110, e.g., in a CSI report. Wireless network node 120 may, e.g., perform scheduling for wireless terminal 110 based on the parameter(s), physical layer parametrization for downlink and/or uplink, beamforming configuration for wireless terminal 110 and/or wireless network node 120 and/or CSI measurement configuration. Moreover, in some example embodiments, wireless network node 120 may configure or reconfigure said one or more parameters related to operation of wireless terminal 110 based on the estimated level of beam squint at wireless network node 120.

In some example embodiments, said determining the configuration for communicating with wireless terminal 110 may comprise (re) configuring one or more of the following parameters related to wide channel bandwidth operation based on the parameter(s) and/or the estimated level of beam squint at wireless network node 120, such as maximum scheduling bandwidth per panel, channel bandwidth used per subpanel and transmit or receive beamwidth (or beamforming gain).

Alternatively, or in addition, wireless network node 120 may perform one or more of the following actions based on the parameter(s) and/or the estimated level of beam squint at wireless network node 120:

Decrease granularity of a frequency dimension precoder as the departure/arrival angle or angle offset increases (e.g., granularity is decreased from 8.64 GHz to 2.16 GHz). That is to say, said determining the configuration for communicating with wireless terminal 110 may comprise decreasing a frequency dimension precoder granularity upon determining that an angular distance between the normal of the at least one antenna panel of wireless terminal 110 and a direction of reception of the beamformed signal by wireless terminal 110 is larger than a previously received parameter. In general, said determining the configuration for communicating with wireless terminal 110 may comprise decreasing a frequency dimension precoder granularity upon determining that at least one of a beam squint at wireless terminal 110 and a beam squint at wireless network node 120 has increased. Hence wireless terminal 110 may decrease, based on the received configuration, a frequency dimension precoder granularity when at least one of a beam squint at wireless terminal 110 and a beam squint at wireless network node 120 has increased;

Switch operation mode from channel bonding to TRP aggregation as the departure/arrival angle or angle offset increases (in TRP aggregation, each TRP may transmit a part of the full channel bandwidth, e.g., 4 TRPs used to transmit 2.16 GHz frequency allocations, aggregating in RX into one 8.64 GHz allocation, which can be considered as an example of using full panel or sub-panel operation for transmission or reception). That is to say, said determining the configuration for communicating with wireless terminal 110 may comprise switching from channel bonding to transmission point aggregation upon determining that an angular distance between the normal of the at least one antenna panel of wireless terminal 110 and a direction of reception of the beamformed signal by wireless terminal 110 is larger than a previously received parameter. In general, said determining the configuration for communicating with wireless terminal 110 may comprise switching from channel bonding to transmission point aggregation upon determining that at least one of a beam squint at wireless terminal 110 and a beam squint at wireless network node 120 has increased. Hence wireless terminal 110 may switch, based on the received configuration, from channel bonding to transmission point aggregation when at least one of a beam squint at wireless terminal 110 and a beam squint at wireless network node 120 has increased;

In case of carrier aggregation, width of the carrier may be reduced when the departure/arrival angle or angle offset increases, e.g., from 2×4 GHz to 4×2 GHz. That is to say, said determining the configuration for communicating with wireless terminal 110 may comprise reducing a width of the carrier upon determining that an angular distance between the normal of the at least one antenna panel of wireless terminal 110 and a direction of reception of the beamformed signal by wireless terminal 110 is larger than a previously received parameter. In general, said determining the configuration for communicating with wireless terminal 110 may comprise reducing a width of a carrier upon determining that at least one of a beam squint at wireless terminal 110 and a beam squint at wireless network node 120 has increased. Hence wireless terminal 110 may reduce, based on the received configuration, a width of a carrier when at least one of a beam squint at wireless terminal 110 and a beam squint at wireless network node 120 has increased;

Frequency resolution of beam/CSI reporting may be increased as the departure/arrival angle or angle offset increases.

In some example embodiments, wireless network node 120 may define a used bandwidth per subpanel based on the parameter(s) and/or the estimated level of beam squint at wireless network node 120. For instance, wireless network node 120 may define the bandwidth to be used based on the angular distance between the normal of the at least one antenna panel of wireless terminal 110 and a direction of a receive beam by wireless terminal 110. Alternatively, or in addition, wireless network node 120 may define the bandwidth to be used based on the beamforming angle seen from at least one antenna panel of wireless network node 120.

In some example embodiments, a full wide channel bandwidth signal may be divided in frequency into component signals and each component signal may be transmitted through a different subpanel to achieve improved beamforming capability or reduced beam squint distortion. Each subpanel may use the same beam index or different beam index, to allow optimal beamforming gain for the selected frequency allocation. The use of the same beam index indicates that sub-panels are transmitting towards, or receiving from, the same direction, thereby providing the maximum gain. The use of the different beam index indicates a multi-user MIMO scenario. Division of the full wide channel bandwidth signal into multiple component signals transmitted through different subpanels may also be referred to as Transmission Point, TRP, aggregation.

The bandwidth of the transmitted signal may be limited such that a desired beamforming accuracy is achieved and frequency selectivity induced by beam squint is limited within a given threshold. For example, a beamforming accuracy metric may be 3 dB beamwidth of the beamformed signal or 3 dB bandwidth (in frequency) of the beamformed signal. 3 dB bandwidth of the beamformed signal depends on the antenna panel dimensions of the transmitter and receiver, realized angular offset between the planar wave and beam direction, and on the target beam direction of the transmitter and the receiver.

In some example embodiments, wireless network node 120 may order wireless terminal 110 to use a specific maximum bandwidth per subpanel BS orders different centre frequencies for signals received/transmitted through each subpanel based on, for example, required information about the quality of beamforming, the at least one parameter which is based on a metric, dimensions of the antenna panel of wireless terminal 110, beam orientation with reference to the panel normal of wireless terminal 110, and frequency selective SINR reporting from wireless terminal (which may be linked to the angle offset between wave direction and beam direction, i.e., the angle offset between the true angle of arrival/departure and beam direction). Wireless network node 120 may for example request reporting for up-to N best receive and/or transmit beams of the antenna panel of wireless terminal 110, reporting separately per subpanel, configure reporting threshold for UE initiated measurements and/or define separate or joint reporting for transmit and receive beams of wireless terminal 110.

In some example embodiments, wireless network node 120 may control transmission and reception operation of wireless terminal 110 to optimize beamforming gain of wireless terminal 110 and use of different antenna subpanels, assuming wireless network node 120 has information of dimensions of the at least one of antenna panel of wireless terminal 110, beam orientation and frequency selective SINR distribution. Furthermore, if wireless network node 120 is connected to multiple wireless terminals, it may control and optimize beamforming and resource usage over multiple UEs to maximize overall system performance.

At optional step 360, wireless network node 120 may transmit the determined configuration, or a part of it such as one or more parameters related to operation of wireless terminal 110, to wireless terminal 110 if needed. For instance, wireless network node 120 may indicate a selected (re) configuration to wireless terminal 110, wherein the selected (re) configuration may be based on the received parameter(s) and/or the beam squint level estimated at wireless network node 120. In some example embodiments, the determined configuration may be related to operation with wide channel bandwidths.

Wireless terminal 110 may thus receive said one or more parameters related to operation of wireless terminal 110 and (re) configure its operation based on the received one or more parameters, e.g., including maximum scheduling bandwidth per panel, channel bandwidth used per subpanel, transmit or receive beamwidth (or beamforming gain), frequency domain precoder granularity, switching between channel bonding and TRP aggregation, carrier aggregation configuration and/or beam/CSI reporting configuration.

At step 370, wireless network node 120 may transmit to wireless terminal 110 or receive from wireless terminal based on the selected (re) configuration. That is to say, wireless terminal 110 and wireless network node 120 may communicate at step 370 using the determined configuration, such as the selected (re) configuration.

Figure 4:
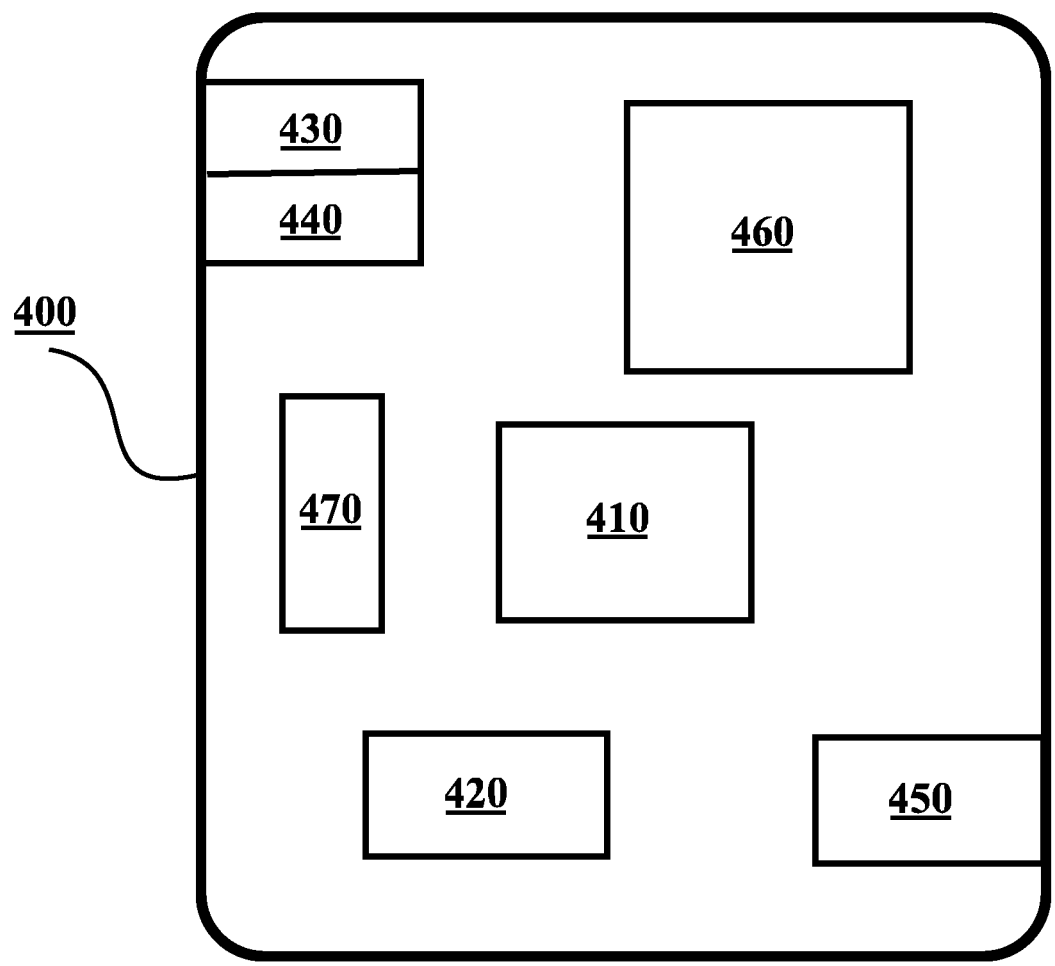
FIG. 4 illustrates an example apparatus capable of supporting at least some embodiments.

FIG. 4 illustrates an example apparatus capable of supporting at least some embodiments. Illustrated is device 400, which may comprise, for example, wireless terminal 110 or wireless network node 120, or a device controlling functioning thereof. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in device 400. Processor 410 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 400 may comprise a Near-Field Communication, NFC, transceiver 450. NFC transceiver 450 may support at least one NFC technology, such as Bluetooth, Wibree or similar technologies.

Device 400 may comprise User Interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a Subscriber Identity Module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the embodiments.

Figure 5:
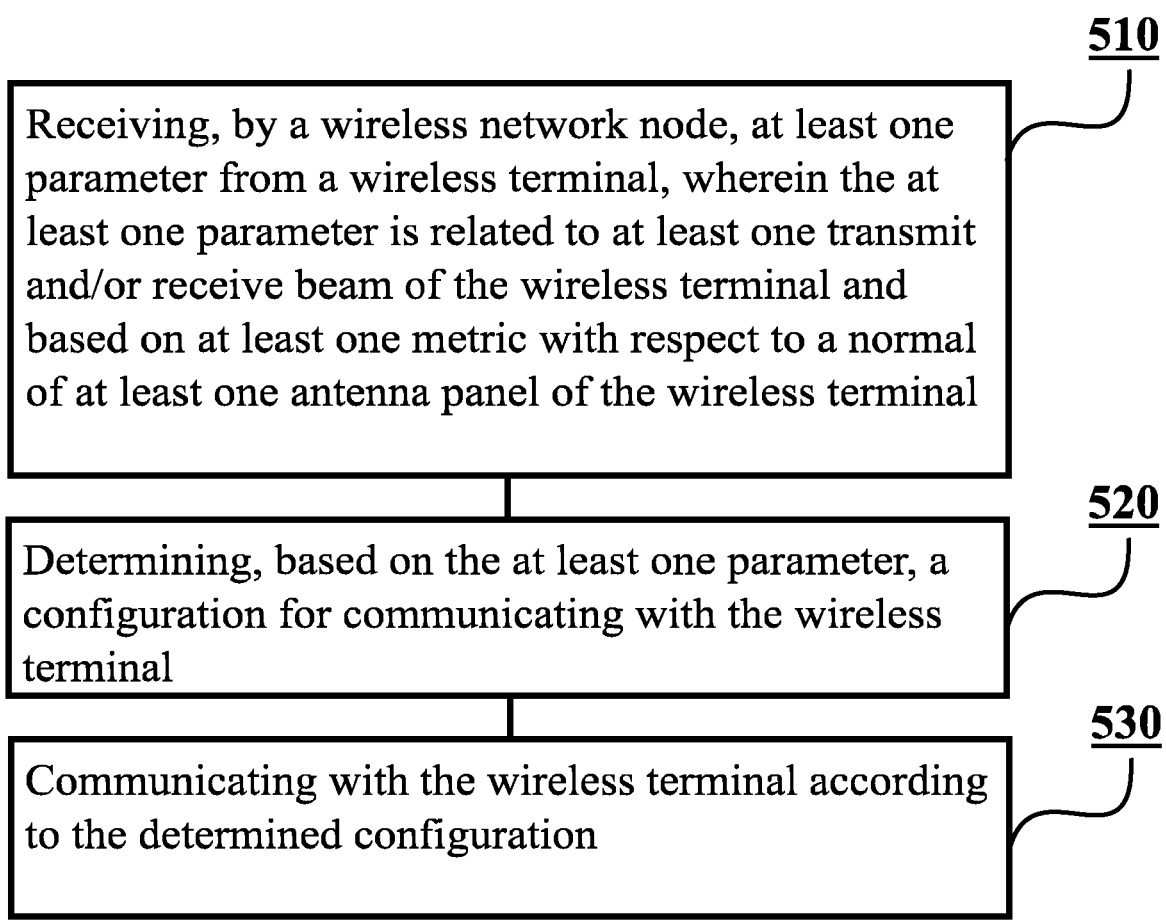
FIG. 5 illustrates a flow graph of a first method in accordance with at least some embodiments.

FIG. 5 is a flow graph of a first method in accordance with at least some embodiments. The phases of the illustrated first method may be performed by wireless network node 120, or by a control device configured to control the functioning thereof, possibly when installed therein.

The first method may comprise, at step 510, receiving, by a wireless network node, at least one parameter from a wireless terminal, wherein the at least one parameter is related to at least one transmit and/or receive beam of the wireless terminal and based on at least one metric with respect to a normal of at least one antenna panel of the wireless terminal. The first method may also comprise, at step 520, determining, based on the at least one parameter, a configuration for communicating with the wireless terminal. Finally, the first method may comprise, at step 530, communicating with the wireless terminal according to the determined configuration.

Figure 6:
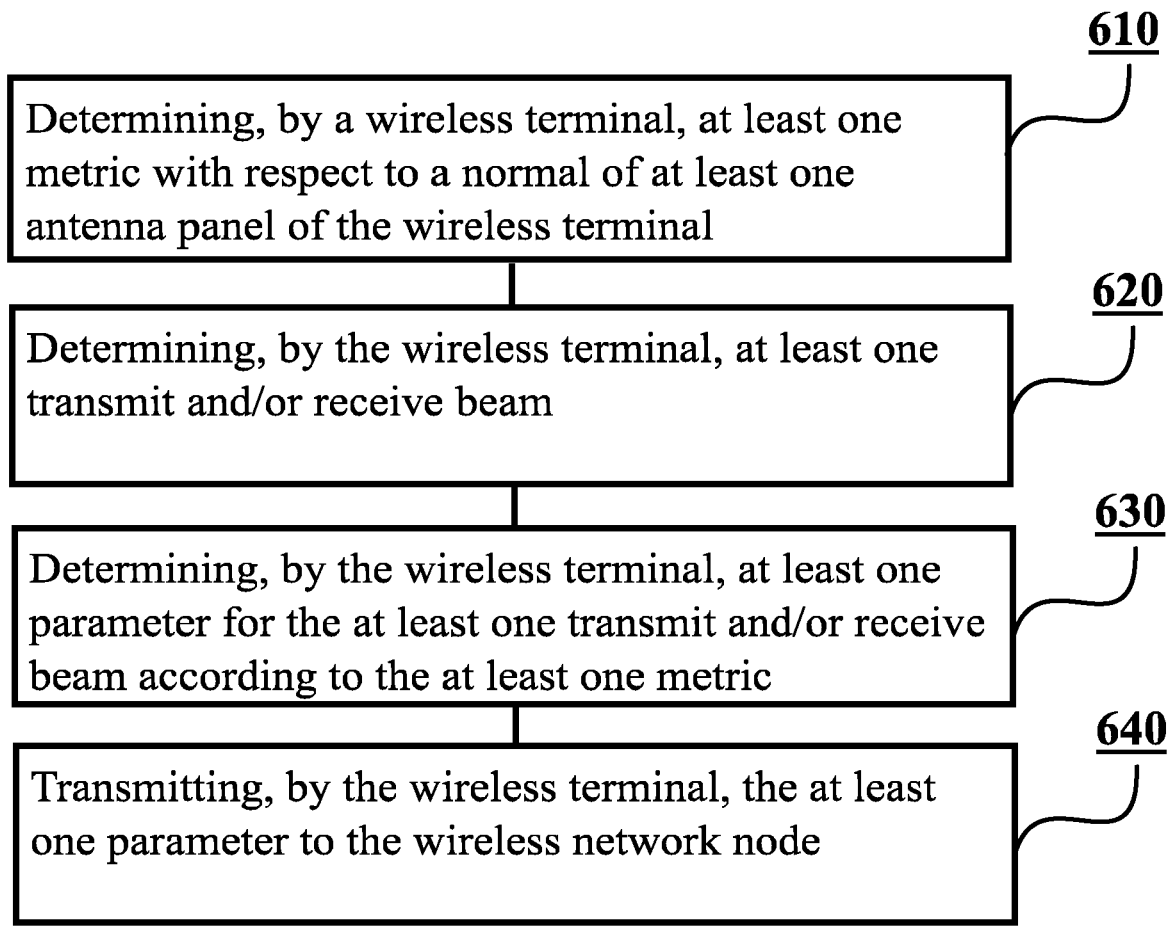
FIG. 6 illustrates a flow graph of a second method in accordance with at least some embodiments.

FIG. 6 is a flow graph of a second method in accordance with at least some embodiments. The phases of the illustrated second method may be performed by wireless terminal 110, or by a control device configured to control the functioning thereof, possibly when installed therein.

The second method may comprise, at step 610, determining, by a wireless terminal, at least one metric with respect to a normal of at least one antenna panel of the wireless terminal. The second method may also comprise, at step 620, determining, by the wireless terminal, at least one transmit and/or receive beam. At step 630, the second method may comprise determining, by the wireless terminal, at least one parameter for the at least one transmit and/or receive beam according to the at least one metric. Finally, the second method may comprise, at step 640, transmitting, by the wireless terminal, the at least one parameter to the wireless network node.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, wireless terminal 110 or wireless network node 120, or a control device configured to control the functioning thereof, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, wireless terminal 110 or wireless network node 120, or a control device configured to control the functioning thereof, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in communication networks, for example in cellular communication networks wherein beamforming is used, such as in 5G networks.

ACRONYMS LIST

3GPP 3rd Generation Partnership Project
BS Base Station
CPE Customer Premises Equipment
DU Distributed Unit
GSM Global System for Mobile communication
IAB Integrated Access and Backhaul
IoT Internet of Things
LTE Long-Term Evolution
M2M Machine-to-Machine
MT Mobile Termination
MTC Machine Type Communications
NFC Near-Field Communication
NR New Radio
PUCCH Physical Uplink Control Channel
PRACH Physical Random Access Channel
RAN Radio Access Network
RAT Radio Access Technology
RF Radio Frequency
RRC Radio Resource Control
TRP Transmission Point
UE User Equipment
UI User Interface
WCDMA Wideband Code Division Multiple Access

| REFERENCE SIGNS LIST | |
| --- | --- |
| 110 | Wireless terminal |
| 115 | Beams |
| 120 | Wireless network node |
| 125, 135 | Wired interfaces |
| 130 | Core network |
| 210, 220, 230, 240 | Angles |
| 215 | Normal of an antenna panel |
| 310-340 | Phases of the signaling graph of FIG. 3 |
| 400-470 | Structure of the apparatus of FIG. 4 |
| 510-530 | Phase of the first method in FIG. 5 |
| 610-640 | Phase of the second method in FIG. 6 |

The invention claimed is:

1. An apparatus comprising at least one processing core, at least one memory including computer program code, the at least one memory and the computer program code being configured to, with the at least one processing core, cause a wireless network node at least to:

receive at least one parameter from a wireless terminal, wherein the at least one parameter is related to at least one transmit and/or receive beam of the wireless terminal and based on at least one metric with respect to a normal of at least one antenna panel of the wireless terminal;

determine, based on the at least one parameter, a configuration for communicating with the wireless terminal; and communicate with the wireless terminal according to the determined configuration, wherein said determining the configuration for communicating with the wireless terminal comprises decreasing a frequency dimension precoder granularity upon determining that at least one of a beam squint at the wireless terminal and a beam squint at the wireless network node has increased.

2. The apparatus according to claim 1, wherein the at least one metric comprises an angular distance between the normal of the at least one antenna panel of the wireless terminal and a direction of the at least one transmit and/or receive beam of the wireless terminal.

3. The apparatus according to claim 2, wherein the angular distance between the normal of the at least one antenna panel of the wireless terminal and the direction of the at least one transmit and/or receive beam of the wireless terminal comprises an azimuth and/or elevation angle.

4. The apparatus according to claim 1, wherein the at least one transmit and/or receive beam is for at least one predefined beam pair link.

5. The apparatus according to claim 1, wherein the at least one parameter is further based on a metric that comprises a frequency selective signal-to-interference ratio of the at least one receive and/or transmit beam of the wireless terminal.

6. The apparatus according to claim 1, wherein the at least one parameter is based on a metric that relates to an orientation of the wireless terminal, an orientation of at least one panel of the wireless terminal, and/or location information of the wireless terminal.

7. The apparatus according to claim 1, wherein the wireless network node further caused to at least:

receive a random access channel preamble or a reference signal from the wireless terminal;

estimate a beam squint at the wireless network node based on the random access channel preamble or the reference signal; and determine the configuration for communicating with the wireless terminal based on the estimated beam squint.

8. The apparatus according to claim 1, wherein said determining the configuration for communicating with the wireless terminal comprises switching from channel bonding to transmission point aggregation upon determining that at least one of a beam squint at the wireless terminal and a beam squint at the wireless network node has increased.

9. An apparatus comprising at least one processing core, at least one memory including computer program code, the at least one memory and the computer program code being configured to, with the at least one processing core, cause a wireless terminal at least to:

determine at least one metric with respect to a normal of at least one antenna panel of the wireless terminal;

determine at least one transmit and/or receive beam;

determine at least one parameter for the at least one transmit and/or receive beam according to the at least one metric; and transmit the at least one parameter to a wireless network node, wherein the wireless terminal is further caused to at least:

decrease a frequency dimension precoder granularity when at least one of a beam squint at the wireless terminal and a beam squint at the wireless network node has increased.

10. The apparatus according to claim 9, wherein the at least one metric comprises an angular distance between the normal of the at least one antenna panel of the wireless terminal and a direction of the at least one transmit and/or receive beam of the wireless terminal.

11. The apparatus according to claim 10, wherein the angular distance between the normal of the at least one antenna panel of the wireless terminal and the direction of the at least one transmit and/or receive beam of the wireless terminal comprises an azimuth and/or elevation angle.

12. The apparatus according to claim 11, wherein the at least one transmit and/or receive beam is for at least one predefined beam pair link.

13. The apparatus according to claim 9, wherein the at least one parameter is determined based on at least one measurement performed by the wireless terminal.

14. The apparatus according to claim 9, wherein said determining the at least one parameter is further based on a metric that comprises a frequency selective signal-to-interference ratio of the at least one transmit and/or receive beam of the wireless terminal.

15. The apparatus according to claim 9, wherein the at least one parameter is based on a metric that relates to an orientation of the wireless terminal, or an orientation of at least one panel of the wireless terminal, and/or location information of the wireless terminal.

16. The apparatus according to claim 9, wherein the wireless terminal further caused to at least:

switch from channel bonding to transmission point aggregation when at least one of a beam squint at the wireless terminal and a beam squint at the wireless network node has increased.

17. The apparatus according to claim 9, wherein the wireless terminal further caused to at least:

reduce a width of a carrier when at least one of a beam squint at the wireless terminal and a beam squint at the wireless network node has increased.

18. A method, comprising:

determining, by a wireless terminal, at least one metric with respect to a normal of at least one antenna panel of the wireless terminal;

determining, by the wireless terminal, at least one transmit and/or receive beam;

determining, by the wireless terminal, at least one parameter for the at least one transmit and/or receive beam according to the at least one metric; and transmitting, by the wireless terminal, the at least one parameter to the wireless network node, the method further comprising:

switching from channel bonding to transmission point aggregation when at least one of a beam squint at the wireless terminal and a beam squint at the wireless network node has increased.

19. The apparatus according to claim 18, wherein the at least one metric comprises an angular distance between the normal of the at least one antenna panel of the wireless terminal and a direction of the at least one transmit and/or receive beam of the wireless terminal.

20. The apparatus according to claim 19, wherein the angular distance between the normal of the at least one antenna panel of the wireless terminal and the direction of the at least one transmit and/or receive beam of the wireless terminal comprises an azimuth and/or elevation angle.

\* \* \* \* \*